United States Patent
Nichols et al.

(10) Patent No.: US 9,664,784 B2
(45) Date of Patent: May 30, 2017

(54) SYSTEM AND METHODS FOR DATA POINT DETECTION AND SPATIAL MODELING

(71) Applicant: Trimble Navigation Limited, Sunnyvale, CA (US)

(72) Inventors: Mark Edward Nichols, Christchurch (NZ); Gregory Craig Wallace, Arvada, CO (US)

(73) Assignee: Trimble Inc., Sunnyvale, CA (US)

(*) Notice: Subject to any disclaimer, the term of this patent is extended or adjusted under 35 U.S.C. 154(b) by 577 days.

(21) Appl. No.: 14/096,305

(22) Filed: Dec. 4, 2013

(65) Prior Publication Data

US 2015/0153444 A1 Jun. 4, 2015

(51) Int. Cl.
| | | |
|---|---|---|
| G01S 1/00 | (2006.01) | |
| G01S 19/00 | (2010.01) | |
| G01S 13/00 | (2006.01) | |
| G01S 13/72 | (2006.01) | |
| G01S 13/86 | (2006.01) | |
| G01S 13/89 | (2006.01) | |
| G01S 13/93 | (2006.01) | |

(52) U.S. Cl.
CPC ............ *G01S 13/726* (2013.01); *G01S 13/86* (2013.01); *G01S 13/89* (2013.01); *G01S 13/931* (2013.01); *G01S 2013/9353* (2013.01)

(58) Field of Classification Search
USPC ......... 342/20, 27, 357.2, 385, 450; 701/467, 701/468
See application file for complete search history.

(56) References Cited

U.S. PATENT DOCUMENTS

| | | | |
|---|---|---|---|
| 5,668,739 A | 9/1997 | League et al. | |
| 2008/0258964 A1* | 10/2008 | Schoeberl | G01S 7/032 342/189 |
| 2009/0167761 A1* | 7/2009 | Hayashi | G01B 11/24 345/424 |
| 2013/0103301 A1 | 4/2013 | Becker et al. | |
| 2013/0229298 A1* | 9/2013 | Eckstein | G01S 13/726 342/107 |

FOREIGN PATENT DOCUMENTS

| | | |
|---|---|---|
| EP | 1610147 A1 | 12/2005 |
| WO | 2011/106881 A1 | 9/2011 |
| WO | 2013/096704 A1 | 6/2013 |

OTHER PUBLICATIONS

Evans et al., "Consumer radar: Technology and limitations", 2013 International Conference on Radar, Sep. 9, 2013, pp. 21-26.
Li et al., "Radar-on-a-chip (ROACH)", Radar Conference, 2010 IEEE, IEEE, Piscataway, NJ, USA, May 10, 2010, pp. 1224-1228.
PCT/US2014/067177, "International Search Report and Written Opinion", mailed Aug. 10, 2015, 16 pages.

* cited by examiner

*Primary Examiner* — Dao Phan
(74) *Attorney, Agent, or Firm* — Kilpatrick Townsend & Stockton LLP

(57) ABSTRACT

A device and methods are provided for detecting data points using an integrated radar sensor. In one embodiment, a method includes determining position of a device, detecting data points by an integrated radar sensor of the device, wherein the data points are determined for one or more points in space associated with one or more objects, and generating a spatial model of the one or more objects based on the detected data points. The device and methods may advantageously be employed for one or more of mapping, modeling, planning, machine control, navigation and object tracking.

27 Claims, 9 Drawing Sheets

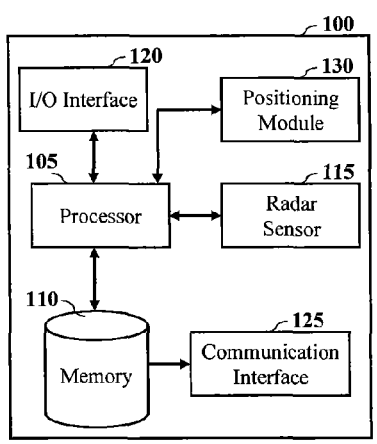
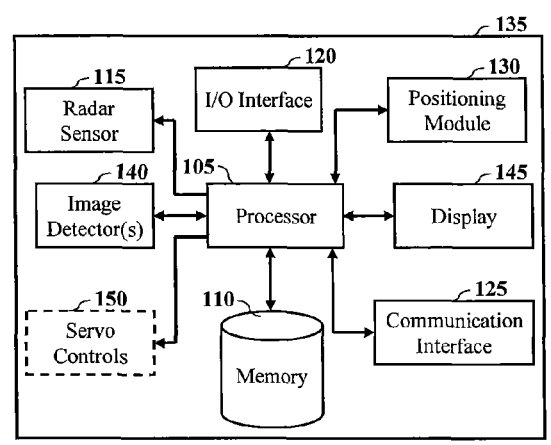
*FIG. 1A*  *FIG. 1B*

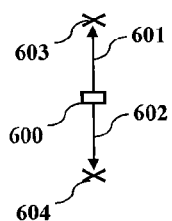 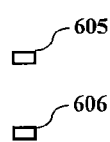 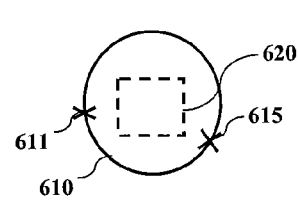
FIG. 6A  FIG. 6B  FIG. 6C
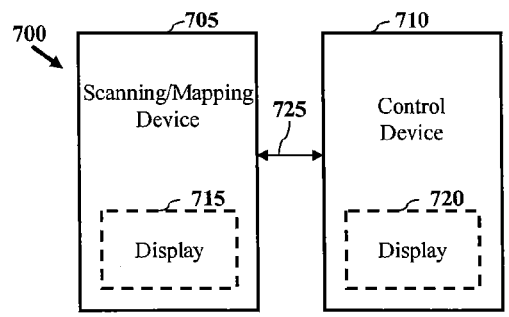
FIG. 7

SYSTEM AND METHODS FOR DATA POINT DETECTION AND SPATIAL MODELING

FIELD

The present disclosure relates generally to electronic devices and methods, and more particularly to a device and methods for detecting data points based on radar scanning, and generating spatial models.

BACKGROUND

Some conventional spatial determination systems employ laser scanning, such as Light Detection and Ranging (LIDAR) systems. One drawback of these conventional systems, and laser scanning in general, is the inherent cost of system components due to the high precision nature of the technology. By way of example, conventional laser systems typically produce vast amounts of data requiring high levels of processing capability. In order to process and utilize the amounts of data generated by laser scanning, commercial systems require specific system components, such as laser processing chip-sets. As a result, there is an increased cost to customers and manufacturers alike.

In addition to cost, there are other drawbacks of laser scanning systems. For one, conventional laser scanning systems may be highly susceptible to error when in motion. Additional drawbacks may be due to the operational frequency of beams employed in a scanning system. For example, detection of distance based on time of flight delay may be difficult to determine for short-range distances due to time-of-flight ranging error. Similarly, it may be difficult to calculate the time of flight delay for a laser system due to the high speed of the optical beam, especially for short-range measurements. Another drawback of laser systems is difficulty in tracking objects. Laser based measurements may be difficult to process due to difficulties in comparing measurement points determined by conventional laser systems. Thus, what is desired is an improved ability of scanning devices which overcomes one or more drawbacks of laser scanning systems.

Conventional radar applications such as Doppler Radar (e.g., Pulsed-Doppler Radar) have long been used for radar scanning and detection of aircraft. Conventional radar applications are not suitable for detection of multiple data points for mapping or tracking of objects due to low resolution scans. As a result, conventional radar scanning applications have not been employed for mapping or tracking of multiple objects with high resolution.

The University of Melbourne has developed a Radar on a Chip (ROACH) system, which is hereby incorporated by reference, that allows for advanced driving assistance. In particular, the ROACH system is for advanced driving assistance to reduce risk and impact of accidents and collisions.

There exists a need in the art for methods and devices to provide radar scanning, and in particular for data point detection and spatial modeling with radar sensing.

BRIEF SUMMARY OF THE EMBODIMENTS

Disclosed and claimed herein are a device and methods for detecting data points and spatial modeling. In one embodiment, a method includes determining position of a device, and detecting data points by an integrated radar sensor of the device, wherein the data points are determined for one or more points in space associated with one or more objects. The method further includes generating a spatial model of the one or more objects based on the detected data points, wherein the spatial model is generated relative to the position of the device, storing, by the device, the data points, and storing, by the device, the spatial model.

In another embodiment, a method for determining data points includes determining position of a device, scanning one or more objects, wherein scanning includes detecting data points by an integrated radar sensor of the device and capturing image data of the one or more objects, and determining data points for one or more points in space associated with the one or more objects based on the scanning. The method further includes matching data points to one or more portions of the image data, assigning matched data points to one or more portions of the image data, and storing, by the device, image data with matched data points.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 1A-1B depict simplified block diagrams of devices according to one or more embodiments;

FIGS. 6A-6C depict a graphical representations of device positioning according to one or more embodiments;

FIG. 7 depicts a simplified system diagram according to one or more embodiments;

DETAILED DESCRIPTION OF THE EXEMPLARY EMBODIMENTS

Overview and Terminology

Figure 2A:
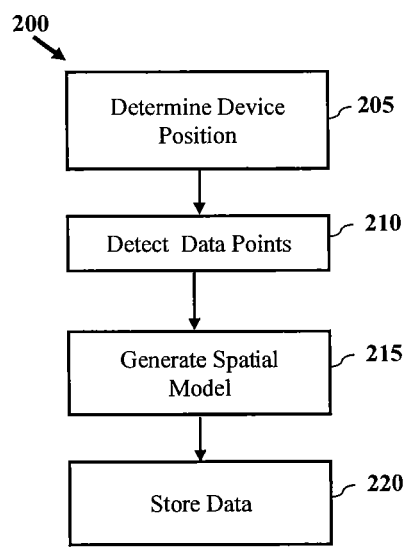
FIG. 2A depicts a process for detecting and mapping data points according to one or more embodiments.

One aspect of the disclosure relates to detecting data points for one or more objects using a radar sensor. In particular, data points may be detected for spatial mapping and/or tracking of one or more objects. In one embodiment, data points associated with one or more objects may be detected, and a spatial model of the one or more objects may be generated based on the detected data points. By determining position, such as the position of a device detecting the data points, one or more of geospatial data (e.g., coordinates, etc.), distance, and an azimuth relative to the position of the device, may be determined for each data point detected.

One advantage of the device and functionality described herein may be providing real time detection of one or more objects based on radar scanning with quality precision. In addition, radar scanning may allow for improved processing in comparison to laser-based systems. Objects, as used herein, may be one or more physical elements, such as stationary objects, objects in motion, structures, portions of a structure, interior spaces, etc. In addition, detection of data points for an object may include detection of one or more surfaces, such that spatial mapping may be provided for the surface. In addition, a plurality of objects may be tracked by an integrated radar sensor. According to another embodiment, the integrated radar sensor may be configured for scanning in both horizontal and vertical directions. A spatial model, such as a three-dimensional point cloud, may be determined based on the detected data points. The spatial model may be employed for one or more applications.

According to one embodiment, a high-resolution integrated radar sensor is employed for detecting data points. The measurement resolutions (e.g., range and azimuth resolutions) of the high-resolution integrated radar sensor may be configured for geospatial applications. In certain embodiments, the range resolution of the high-resolution integrated radar sensor may be 1 cm. According to another embodiment, the high-resolution integrated radar sensor may be configured to detect objects with in a range (e.g., distance from sensor) of 20-50 m. Using a 1 GHz bandwidth (e.g., the chirp sweep range), the range resolution of the high-resolution integrated radar sensor may be 0.05 m. Configuring the high-resolution integrated radar sensor within the 77-81 GHz band and using 2-3 GHz radar bandwidth, the high-resolution integrated radar sensor can provide a 0.02 m resolution with single chirp. In certain embodiments, the high-resolution integrated radar sensor may employ pulse integration to provide a 2 cm range resolution with an azimuth resolution of 0.2 deg.

Azimuth resolution and field of view are decoupled from the range resolution, and may be set by the array geometry and the phased chirp of the high-resolution integrated radar sensor. The high-resolution integrated radar sensor may employ a custom array (different size and higher number of elements X and Y) to increase the resolution for a single shot in certain embodiments. According to another embodiment, the high-resolution integrated radar sensor can use a number of several overlapping phased pulses to artificially increase resolution (e.g., each pulse 2 mS) to allow for static scenes (over 10-20 mS, i.e. short time). In some cases, the performance of the high-resolution integrated radar sensor may achieve at best a 0.1 deg azimuth resolution.

According to another embodiment, data points may be determined by a radar sensor operating with a frequency in the range of 76-82 GHz. Exemplary configurations of the high-resolution integrated radar sensor can be configured to provide range resolution of 1.7 cm at a distance of 5 m and 10 cm range resolution at a distance of 30 m. The depth resolution may be fixed at 1 cm. This configuration is suitable for geospatial mapping (e.g., scanning trees, buildings, structures, etc.). In certain embodiments, a device may be configured to remotely measure multiple features of an asset at once (e.g., without single laser aiming) to a 10 cm accuracy from 30 m.

According to another embodiment, The high-resolution integrated radar sensor may be configured to detect data points based on a coordinate system. According to one exemplary embodiment, measurements of radar sensor may generate measurement data associated with a polar coordinate system. The measurement data may then be converted to grid based measurements, such as a cartesian grid. Data points may be determined based on a predetermined grid spacing for the grid measurements. In one embodiment, data points may be determined with grid spacings for mapping data points may be in the range of 5 mm-2 cm. The integrated radar sensor may be configured with a range of up to 200 meters (m). In that fashion, one or more objects may be detected to allow for spatial modeling based on more of more detected data points. It should be appreciated that the devices and processes described herein may be applied to other grid spacing and frequency ranges.

According to another embodiment, methods and devices are provided for scanning one or more objects including detecting data points by an integrated radar sensor and capturing image data of one or more objects. In that fashion, the output of employed radar technology may be fused with one or more image sensors. For example, data generated by a radar sensor and one or more imaging sensors may be used to generate spatial models, and tracking one or more objects. According to another embodiment, captured image data may be matched to data points detected by the radar sensor. Geospatial data may then be matched with image data according to one or more embodiments.

One or more embodiments may employ radar technology with characteristics that meet requirements for a low cost sensor, for fusion applications (e.g., image and radar data), and that offers complimentary capability of direct bearing, range and doppler measurements. Even though precision and resolution may be lower for a radar sensor compared to traditional laser bearing/range measurement technologies, radar sensors should find widespread adoption in applications in the same way that low cost MEMs inertial sensors are finding widespread adoption in applications beyond dead reckoning where higher performing FOG or mechanical gyroscopes were never employed.

According to one or more embodiments, detection of data points, spatial modeling, and/or tracking of objects may provide advantageous benefits for one or more applications. In one embodiment, a device and methods are provided to identify moving objects in the field of view of the radar sensor for tracking data points and/or objects for motion elimination in computer vision algorithms, such as instances where an image frame overlaps with some or all of a radar sensor field of view. Another embodiment is directed to providing motion based detection of one or more objects. Detection and characterization of data points when a device is in motion may allow for comparison of geospatial data based on multiple positions of a device to improve accuracy. In addition, motion based scanning may allow for improved modeling of one or more objects.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It should be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a non-transitory medium, etc.

Exemplary Embodiments

Referring now to the figures, FIGS. 1A-1B depict simplified block diagrams of devices according to one or more embodiments. In one embodiment, a device may be configured to detect data points for one or more objects using an integrated radar sensor. The data points may be used for one or more applications, including tracking an object, and generating a spatial model of one or more objects or structures. According to one or more embodiments, detected data points and spatial models may be stored and/or output for one or more of mapping, modeling, planning, machine control, object tracking, etc.

Referring to FIG. 1A, device 100 is shown including processor 105, memory 110, and radar sensor 115. Device 100 may also include input/output interface 120, communication interface 125, and positioning module 130. Elements of device 100 may be configured to communicate and interoperate with processor 105 by a communication bus. Processor 105 may be configured to control operation of device 100, or another device, based on one or more computer executable instructions stored in memory 110. Memory 110 may relate to one of RAM and ROM memories and may be configured to store one or more files, and computer executable instructions for operation of device 100. Although depicted as a single memory unit, memory 110 may relate to one or more of internal device memory and removable memory. Memory 110 may store data associated with data points, positioning data, spatial models, and non-transitory computer readable code for operating device 100.

Device 100, using radar sensor 115, may be configured to detect objects, structures, surfaces, etc. As used herein, a data point is a geospatial point, determined relative to a coordinate system and associated with the surface of an object detected by a radar sensor. Each data point may be determined relative to a determined position of radar sensor 115. In one embodiment, multiple data points may be detected at one time by radar sensor 115. Processor 105 may control storage of each data point in memory 110 and in some cases storage may be based on or associated with a reference point. One or more characteristics of data points may be stored for each reference point to include geospatial data of the data point and/or the reference point.

According to one embodiment, radar sensor 115 may be a high-resolution sensor for detecting and scanning data points. Radar sensor 115 may be an integrated radar sensor configured to use long range and/or short range beams. In certain embodiments, radar sensor 115 may be an integrated radar sensor, such as a chip based radar sensor configured to detect data points for distances up to 200 m. By employing an integrated radar sensor, the sensor may be employed for applications previously impractical due to size, power and cost of sensors. In addition, embodiments described herein may provide a portable positioning system having one or more sensors or detectors, where lower performing/low cost devices (e.g., cameras or MEMs' based sensors) can be used together to improve performance, rather than reliance on any one high performing, expensive sensor. It should be appreciated however, that radar sensor 115 may detect objects with a resolution to support point clouds within the range 1 mm to 100 mm, and/or for different ranges.

In certain embodiments, radar sensor 115 may generate measurement data associated with a polar coordinate system. As will be discussed below with Reference to FIGS. 2A-2B, the measurement data may then be converted to grid based measurements, such as a measurements associated with a cartesian grid. In certain embodiments, data points may be determined by device 100 based on a predetermined grid spacing for the grid measurements.

Radar sensor 115 may be configured to detect data points based on operation within a frequency range of 76-82 GHz, or similarly in the frequency range of 77-81 GHz. As an integrated radar sensor, radar sensor 115 may operate with low power, with a small package and at low cost. The beam of radar sensor 115 may have a broader beam cross section, in comparison to a laser beam, and thus strikes a much larger surface area. As such, a radar based system as described herein can reduce the number of data points in comparison to the number of data points required for a laser system. Radar sensor 115 may be a solid-state radar sensor or chip-based radar sensor, configured for beam steering and/or vertical and horizontal scanning to generate a three-dimensional point cloud. Multiple data points of the point cloud may be determined by radar sensor 115 in a single sweep.

According to one embodiment, radar sensor 115 may have a short-range mode with a range of 50 m, and a long-range mode with a range of up to 200 m. In certain embodiments, radar sensor 115 may include a range accuracy for the short-range mode (e.g., 0.02 m) and a range accuracy for the long-range mode (e.g., 0.15 m). Radar sensor 115 may be configured to detect objects with in a range (e.g., distance from sensor) of 20-50 m. Using a 1 GHz bandwidth (e.g., the chirp sweep range), the range resolution of radar sensor 115 may be 0.05 m. Radar sensor 115 may be configured within the 77-81 GHz band and using 2-3 GHz radar bandwidth and can provide better than 0.02 m resolution with single chirp. In certain embodiments, radar sensor 115 may employ pulse integration to provide a 2 cm range resolution with an azimuth resolution of 0.2 deg. In certain embodiments, radar sensor 115 may include one or more of a planar patch antenna, dielectric lens antenna and reflector antenna. Processor 105 may be configured to convert data points detected by radar sensor 115 in two or three dimensions.

According to one or more embodiments, radar sensor 115 may produce bearing, range and doppler data for objects in the field of view of the sensor, without reliance on ambient light, or susceptibility to difficult lighting conditions. Benefits of radar sensor 115 may be a sensor that is without moving parts, and a low susceptibility to environmental factors such as dust on sensor lens, vibration, and weather conditions. These benefits may be a key advantage of radar sensor 115 compared to other technologies. Radar sensor 115 may have a wide number of applications which conventional alternatives, such as laser scanners (e.g., LIDAR), are not suitable.

Input output (I/O) interface 120 may be configured to receive and/or output data and/or commands to one or more output devices. According to one embodiment, I/O interface 120 may be configured to receive one or more user commands. I/O interface 120 may include one or more buttons to control operation of device 100 including controlling selection of content for display and controlling operation of device 100. Input buttons of I/O interface 120 may include one or more buttons for user input, such as a such as a numerical keypad, volume control, menu controls, pointing device, track ball, mode selection buttons, and functionality (e.g., coordinate detection, aiming, calibration, data acquisition, etc.). Input buttons of I/O interface 120 may include hard and soft buttons, wherein functionality of the soft buttons may be based on one or more applications running on device 100.

Communication interface 125 may include one or more elements to allow for communication by device 100 by wired or wireless communication. Communication interface 125 may include one or more ports for receiving data, including ports for removable memory. Communication interface 125 may be configured to allow for wired and wireless network based communications including but not limited to LAN, WAN, Wi-Fi, etc. In certain embodiments, communication interface 125 may allow for short-range wireless communication with one or more devices.

Positioning module 130 may be configured to receive positioning data from one or more sources, such as global positioning data (e.g., Global navigation Satellite System (GNSS), International GNSS Service (IGS), etc.). Based on positioning data received by device 100, positioning module 130 can determine a position and orientation of the device. The position and/or orientation may be used as a reference point for collecting additional data and/or determining data points. Image data collected by device 100 may be stored in association with one or more of radar sensor data and positioning data determined by the device. In certain embodiments, motion and changes in orientation of device 100 may be detected by positioning module 130. Positioning module 130 may be configured to detect and characterize motion of the device. Based on the positioning of the device, processor 105 can determine one or more commands for operating the device.

According to another embodiment, device 100 may relate to an electronic device or portable (e.g., handheld) computing device. In some embodiments, device 100 may be incorporated into another device, such as a mobile unit for collection and scanning of data points. It should also be appreciated that device 100 may be configured to receive one or more directional, motion or control commands for elements of the device.

According to another embodiment, spatial models may be determined and/or incorporated with image data. FIG. 1B depicts the device of FIG. 1A according to another embodiment. Device 135 of FIG. 1B may be configured to capture image data. Elements of device 135 can operate similarly to the elements of device 100 in FIG. 1A, the discussion of which is incorporated by reference. Accordingly, device 135 may operate similar to device 100. It should be appreciated that devices 100 and 135 may include one or more additional sensors, such as cameras or microelectromechanical system (MEMs) sensors.

As shown in FIG. 1B, device 135 includes image module 140, and display 145. Imaging module 140 may include one or more imaging sensors for detecting image and/or video data. Image sensors of imaging module 140 may relate to one or more cameras or imaging devices configured to detect image or video data. The image detectors may allow for a plurality of focal lengths to provide a plurality of zoom levels. Zoom levels of the imaging module 140 may be based on one or more inputs associated with a control screen of the device. Imaging data collected by the device may be aligned with a particular field or target area associated with the radar sensor 115. Image data collected by device 135 may be stored in association with one or more of radar sensor data and positioning data determined by the device. Image module 140 may be configured to detect image data with a range and detection window similar to radar sensor 115.

Device 135 may include display 140 configured to display a user interface for controlling device 135 and for displaying one or more of positioning data, data point data, and spatial modeling data. In another embodiment, display 140 may be configured to display image data, such as video data or one or more images detected by imaging module 140. In certain embodiments, display 145 may provide a control screen to control operation of device 135. In one embodiment, processor 105 may be configured to detect an input associated with the control screen and control operation of the device. Memory 110 may store image data, orientation of the radar sensor, and orientation of the imaging module and data points.

In certain embodiments, device 135 may include display 145 to display image data, such as video data and graphics data, alert messages, and display one or more applications executed by processor 105. By way of example, display 145 may be configured to display video image data detected by imaging module 140. In certain embodiments, display 145 may be a touch screen display configured to detect contact, dragging, tap(s), and/or stylus operation. In that fashion, display 145 may be a control screen. Display 145 may be configured to identify data points on displayed image data.

Device 135 may optionally include one or more servo controls 150 to control the position and orientation of radar sensor 115 and imaging module 140. In certain embodiments, servo control 150 can control positioning of one or more of radar sensor 115 and imaging module 140 based on the position and/or motion of device 135. Servo controls 150 may be configured to rotate/reposition the imaging sensor and/or radar sensor relative to a horizontal axis and vertical axis. Servo controls 150 may be configured to adjust position of device sensors relative inputs to the device. In certain embodiments, servo controls 150 may mimic or translate received inputs of a control screen by adjusting the aim or orientation. In certain embodiments, servo controls 150 may include one or more of an accelerometer, gyroscopic sensor, single axis sensors and multiple axis sensors for determining the position and motion of radar sensor and/or imaging module. Servo controls 150 may be configured to position/ orient radar sensor 115, image detector 140 and/or device 135 such that at least one of horizontal and vertical scanning may be provided.

Referring now to FIG. 2A, a process is depicted for detecting and mapping data points according to one or more embodiments. Process 200 may be employed by a device (e.g., device 100, device 135) to detect and map one or more data points according to one or more embodiments. Process 200 may be initiated by determining device position at block 205. The determined position may be used as a reference point for determining data points associated with one or more objects. In certain embodiments, calculated distances to objects and/or data points may be relative to the position of the device when data points are detected. According to one embodiment, determining position of the device may be based on at least one of global positioning data received by the device and an orientation determined for the device.

At block 210, data points are detected. Data points may be determined, by a device, for one or more points in space associated with one or more objects. According to one embodiment, data points are detected by an integrated radar sensor of the device.

In certain embodiments, the radar sensor (e.g., radar sensor 115) may generate measurement data associated with a polar coordinate system. Detecting data at block 210 can include converting the measurement data determined by the radar sensor in a first coordinate system, such as apolar coordinate system, and the measurement data may then be converted to grid based measurements, such as a measurement data associated with a cartesian grid. Data points may be determined based on a predetermined grid spacing for the grid measurements.

In one embodiment, a radar sensor detecting data at block 210 will generate measurement data associated with a polar coordinate system to generate measurement data from the sensor (e.g., raw data). As such, the measurement data can include sensor/measurement areas with a grid size that varies based on distance from the sensor. Thus, in contrast to a fixed grid cartesian system, measurement areas or three-dimensional cells of the polar coordinate system may not be equal size cubes. Rather, the measurements of the radar sensor may represent the weighted average of the content over a cell (e.g., recorded at the center of the cell) according to certain embodiments. In one embodiment, angular resolution of a radar sensor may be 0.1 degree or greater, and the range resolution to be 0.02 m or greater. As such, a directly measured cell size will vary, according to range.

Data points may be detected at block 210 by a radar sensor having a range resolution of 2 cm and an azimuth resolution of 0.2 degrees. In certain embodiments, data points are detected by the radar sensor at block 210 with a resolution of 1.7 cm at 5 m and 10 cm at 30 m. The data points may be detected with a bandwidth frequency within the range of 76-82 GHz.

According to another embodiment, detecting data at block 210 may be based on a radar sensor which may include resolving a returned signal down (e.g., reflected signal) to an approximation of the size of the cell for a coordinate system. In that fashion, the content of the cell may be an average and may include smearing with one or more neighboring cells. In certain embodiments, the radar sensor may be characterized with an azimuth resolution which is larger than its azimuth accuracy. As such, as the distance increases from a radar sensor, the shape of the detection cells may change. In such a case, the range resolution will not change, however the shape of the grid spacing may be increased in one or more dimensions.

According to another embodiment, detecting data at block 210 can account for objects to map to one or more grid spacings. The grid spacing for detecting data at block 210 may be dependent on the range being viewed. As such, nearby objects may be mapped or fitted to a first grid spacing and objects further away may be mapped onto a larger grid spacing. Thus, in certain embodiments grid spacing may be determined by a first grid spacing by the radius (distance) to determine angular displacement. By way of example, using a grid spacing of 1-2 cm at a particular distance, such as 20 m, the grid spacing would doubled for objects at twice the distance.

According to another embodiment, detecting data at block 210 can include application of a coordinate transform radar sensor data to a cartesian coordinate system. The measurement data in the cartesian coordinate system may be employed for one or more of a 3D point cloud representation, analysis, manipulation, etc. In certain embodiments, the grid size for the cartesian coordinate system may be 4 mm or smaller. However, it should be appreciated that the measurement resolution of the radar sensor is not limited to the grid spacing determined for the cartesian coordinate system. In certain embodiments, a grid spacing of the spatial model may be a re-sampling of measurement data detected by the radar sensor. In addition, the grid spacing may be converted to a cartesian grid to avoid loss of precision on close range measurements. It should be appreciated that some applications of data detection at block 210 might retain measurement data in a polar coordinate system. For example, alignment of detected image data may be based on measurements detect at block 210 in polar coordinate system due to lens focal length against pixel data.

Data point detection at block 210 may be based on horizontal and/or vertical scanning. In one embodiment, data points may be detected at block 210 by generating a sweep signal configured to detect a plurality of data points during a single sweep. Detection of data points may include one or more of a short-range mode and a long-range mode for measurement and detection of objects. In one or more embodiments, data points may be detected at block 210 with a grid spacing resolution (e.g., 1-2 cm) and for objects up to a range of 200 m. Data points may relate to geospatial data points determined relative to the position of the device. For example, a data point may be associated with one or more of an interior and exterior of a structure. In one embodiment, data points may be determined by an integrated radar sensor having a frequency within the range of 76-82 GHz. It should be appreciated that data points may be detected based on other grid spacings within the range of 1 mm to 100 mm, and/or for different ranges.

At block 215, the device may generate a spatial model, such as a three-dimensional point cloud, of one or more surrounding objects based on detected data points. The spatial model may be generated relative to the position of the device according to one embodiment. A spatial model can be one or more of a two-dimensional model and a three-dimensional model for the one or more surrounding objects. In certain embodiments, the three-dimensional model may be generated for different surfaces detected by an integrated radar sensor. At block 220, the device can store one or more of the data points and spatial model determined by the device.

Process 200 may be employed by one or more of the devices described herein. In one embodiment, process 200 may be employed by a stationary device for modeling interior and exterior structures. According to another embodiment, process 200 may be employed by a mobile device (e.g., portable, handheld, etc.) for determining data points relative to one or more reference positions. Data points and spatial models may be used for tracking the one or more objects.

Figure 2B:
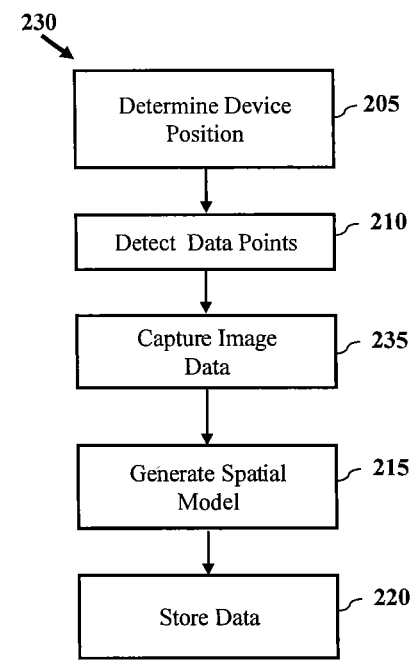
FIG. 2B depicts a process for detecting and mapping data points according to one or more other embodiments.

Referring now to FIG. 2B, process 230 is depicted for detecting and mapping data points according to one or more embodiments. Process 230 includes blocks 205, 210, 215 and 220 described above in FIG. 2A—the description above is incorporated for reference with respect to process 230 of FIG. 2B. Process 230 may be employed by a device (e.g., device 100, device 135) to detect and map one or more data points according to one or more embodiments. Process 230 may be initiated by determining device position at block 205 and detecting data points at block 210. Process 230 may further include capturing image data at block 230, by an image sensor of the device. The image data may include graphical image data (e.g., pixel data) for the one or more objects. The spatial model generated at block 215 may be based on, and in some cases include, the image data captured at block 235 and data points detected at block 210. Generating the spatial model at block 215 may include correlating data points of the spatial model to the captured image data and assigning geospatial data to one or more portions of the image data. According to one embodiment, image data and the spatial model are correlated based on one or more of elevation, azimuth, and reference to a fixed data point, such as a position of the device. Based on the spatial model generated at block 215, captured image data may be displayed to include data points of the spatial model.

Detection of data points, as discussed in FIGS. 2A-2B, may be used for one or more applications, including object tracking and generation of three-dimensional point clouds. One application of data point detection may apply to machine safety, and in particular including detection of data points and/or objects for personnel detection (e.g., situational awareness) and improving sonic sensors. In another embodiment, data point detection may apply to safety applications including one or more of situational awareness, fleet safety (e.g., envelope clearance for tunnel, bridge underpass, loading bays, etc.), vehicle mounted detectors, infrastructure mounted sensors, and temporary envelope monitoring during roadwork. In another embodiment, data point detection may apply to fuel saving applications such as feed forward control for braking optimization in traffic. In other embodiments, data point detection may apply to corridor clearance, tunnel envelope monitoring and continuous envelope monitoring on trains. In yet another embodiment, data point detection may apply to asset mapping for geographic information systems (GIS), mobile three-dimensional scanning (e.g., handheld building envelope mapping), and productivity and cost improvements.

In certain embodiments, data point detection may apply to vehicles including unmanned aerial vehicle (UAV) sensor integration for low altitude aerial mapping, landing collision avoidance, operation at night and/or difficult lighting conditions, and alternatives for microlights.

In other embodiments, data point detection may apply to agricultural uses including non-contact weed detection and safety systems for autonomous vehicles.

According to another embodiment, data point detection may apply remote sensing, such as single shot positioning to eliminate complex workflows (e.g., need for known objects in scene), and cable/transmission line detection, such as situations that pose difficulty in trying to hit targets with hand held single beam laser rangefinder, and situations for measuring ground clearance, and span measurements.

Data point detection may apply to indoor mapping (e.g., traverse from last known good POS, with INS) for applications including identification of utilities assets inside control buildings, determining interior building layouts for quotations, coarse measurements for complex room shapes where simple electronic distance measurements are inefficient or error prone, consumer ranging, and real estate.

In one or more embodiments, data point detection may apply to hand held low-end three-dimensional scanning, metrology applications and 360-degree object detection for forward collision avoidance (e.g., blind spot detection).

In yet another embodiment, data point detection may apply to security systems for counting people, and theft protection (e.g., unattended base station).

Figures 3A, 3B, 3C:
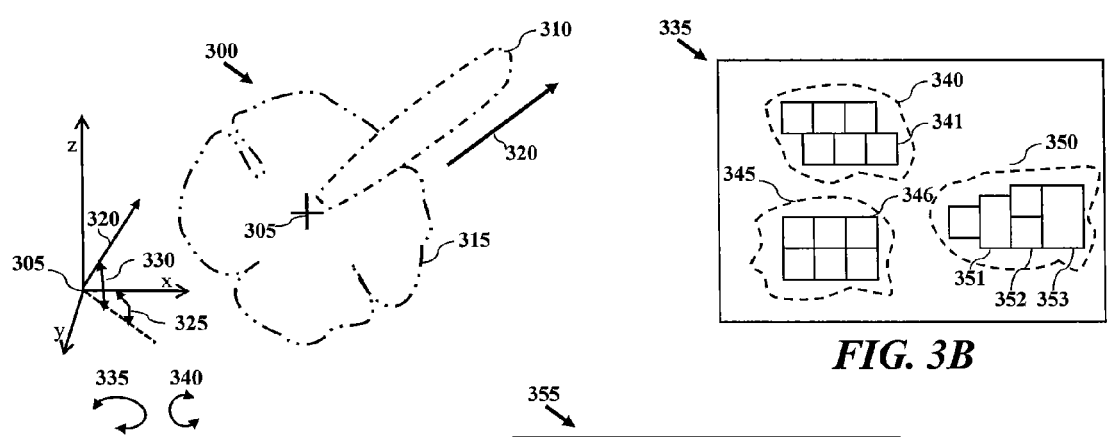
FIG. 3A depicts a graphical representation of a radar sensor beam patterns according to one or more embodiments.
FIG. 3B depicts a graphical representation of a radar sensor grid spacing according to one or more embodiments.
FIG. 3C depicts a graphical representation of a radar sensor grid spacing according to one or more other embodiments.

One aspect of the disclosure is directed to detection of data points with an integrated radar sensor. FIG. 3A depicts a graphical representation of radar sensor beam patterns according to one or more embodiments. Beam pattern 300 of FIG. 3A includes exemplary beam patterns that may be employed for detecting data points according to one or more embodiments. Beam pattern 300 of a radar sensor is shown relative to position 305 and coordinate axes. In certain embodiments, position 305 relates to the position of a device including the radar sensor. According to one embodiment, a radar sensor (e.g., radar sensor 115) may be configured to have a short and long-range beam patterns, shown as directed beam pattern 315 and beam pattern 310, respectively. According to one embodiment, a radar sensor of a device may use beam pattern 315, and/or beam pattern 310, for detecting one or more objects and one or more data points. According to another embodiment, the position of directed beam 310 may be aimed or associated with a particular direction, such as direction 320. Direction 320 may be relative to position 305 and may be used for determining the geospatial position of one or more data points relative to one or more coordinates as shown in FIG. 3A. According to one embodiment, azimuth 325 and elevation 330 may be determined for direction 320 of the beam relative to reference point 305 when data points are determined. In certain embodiments, direction 320 of the radar sensor beam may be rotated as shown by directions 335 (x-axis) and 340 (y-axis).

FIG. 3B depicts a graphical representation of grid spacings according to one or more embodiments. According to one embodiment, data points detected by an integrated radar sensor may be employed to generate a spatial model. Each data point may relate to a spatial area, and may be correlated with a spatial index, such as a unit of a grid having a predetermined dimension or grid spacing. FIG. 3B depicts spatial area 335 and a plurality of exemplary grid patterns. Grid pattern 340 is an offset grid pattern with a plurality of square-shaped grid elements, such as grid element 341. As shown in FIG. 3B, alternating rows of grid elements of grid pattern 340 are offset relative to each other (e.g., aligned or non-offset). Grid pattern 345 is a grid pattern with a plurality of square shaped grid elements, such as grid element 346, wherein the grid elements are aligned in vertical and horizontal rows. Grid pattern 350 is a grid pattern with a plurality of grid elements, such as grid elements 351, 352 and 353. Grid pattern 350 contains elements with a plurality of non-uniform grid spacings. One benefit of non-uniform grid spacings may be to allow for reducing the number of data points, characterizing an area larger than a grid space with particular measurement values (e.g., flat or substantially flat surfaces, open areas, etc.).

Each grid spacing in FIG. 3B may be assigned a one or more positional values, such as distance, azimuth, and coordinates, for generating a spatial model. According to one embodiment, grid elements may relate to an average value generated by a processor (e.g., processor 105) for the grid spacing. Grids may be overlaid or superimposed on the detection area of a radar sensor, data points may be an average value determined for each grid spacing. In some embodiments, grid spacings may be determined based on more that one data point. Each grid spacing may be a detection area for an integrated radar sensor, the value of each spacing may represent the present or absence of an object. Values assigned to a grid spacing may represent a distance of an object (or portion of the object) from the integrated radar sensor. As such, grid spacings may represent a model/mapping for objects at one or more distances or objects with varying dimensions.

According to one embodiment, grid size/spacing is based on the data resolution that may be obtained by a radar sensor. In one embodiment, spatial models may be based on the native coordinate system and actual resolution of the radar sensor. By way of example, the radar sensor may be based on a polar grid situation (e.g., the native sampling frame of reference for the sensor). In some embodiments, there may be a coordinate transformation from the native coordinate system to a Cartesian coordinate system. According to one embodiment, grid size may not be correspond directly to radar resolution. By way of example, at close range polar radar cells may be 1 cm (e.g., pixel box, ignoring depth), while at farther distances the cells are larger than 1 m. Accordingly, a Cartesian grid size may be selected to capture both distances, such that using the smaller grid size produces more resolution than necessary for objects at far distances. Although embodiments are described with a particular grid size, other grid sizes may equally apply.

Although grid elements of FIG. 3B are show as square or rectangular elements, it should be appreciated that grid elements may be provided with other shapes, such as triangular, pentagonal, hexagonal, octagonal, etc.

FIG. 3B depicts spatial area 335 as a two-dimensional representation. According to one or more embodiments, spatial areas may be mapped to generate a three-dimensional representation, such as a three-dimensional point cloud. Referring now to FIG. 3C, a three-dimensional graphical representation is depicted of spatial area 355 generated based on integrated sensor output for an object 360. Object 360 may be represented by a plurality of grid elements, such as grid elements 361 and 362, wherein each grid element is depicted or presented to have a dimension, (e.g., height) representative of the surface and/or distance to an integrated radar sensor. As such, the spatial models may be generated for objects, structures and surface areas.

According to one embodiment, grid elements in FIGS. 3B-3C may be generated having a grid spacing (e.g., grid element width for square element) at distances up to 200 m from an integrated sensor. It should be appreciated however, that the devices and methods herein may be applied to generate spatial models based on other grid spacings with in the range 1 mm to 100 mm, and/or for different ranges.

Figure 4:
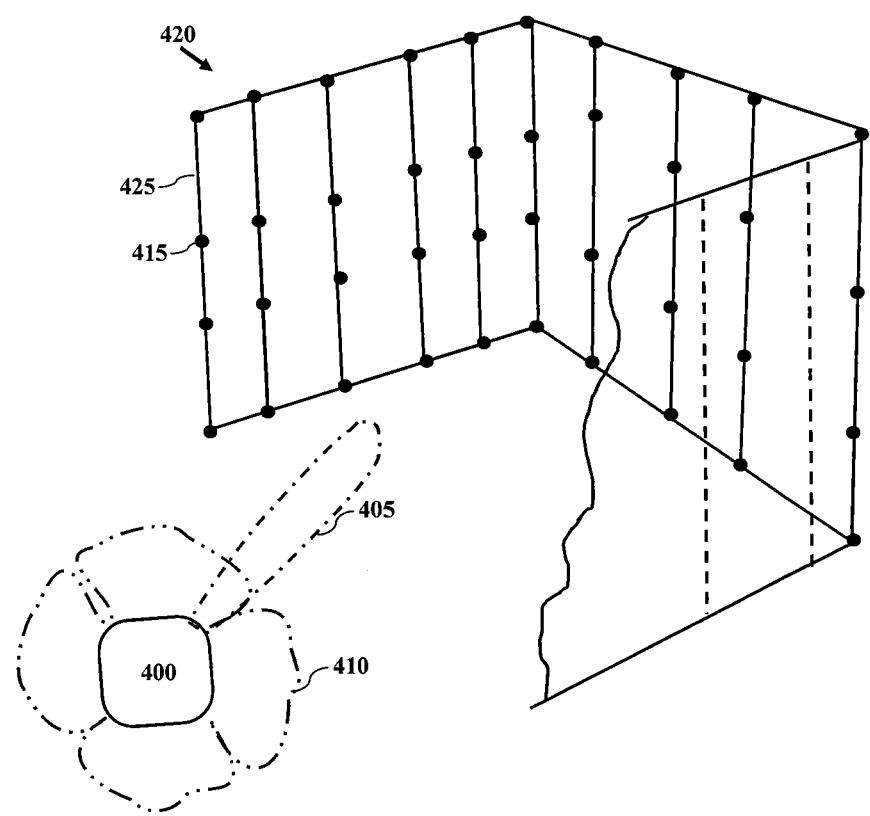
FIG. 4 depicts a graphical representation of a spatial model according to one or more embodiments.

FIG. 4 depicts a graphical representation of a spatial model according to one or more embodiments. According to one embodiment, a device, such as the device of FIGS. 1A-1B, may be configured to detect one or more data points associated with one or more objects. In addition, the device may assign data points to one or more geospatial points of the object, such as object portions with difference geospatial coordinates. Device 400, which may relate to the device of FIG. 1A or device FIG. 1B, can detect one or more data points using an integrated radar sensor by one or more of a directed beam pattern 405 and short-range beam pattern 410. Based on detected data points, device 400 may generate a spatial model, such as spatial model 420. Data points of spatial model 420, shown as 415, can be assigned to one or more surfaces or objects detected by the radar sensor. As shown in FIG. 4, spatial model 420 is relative to a structure having multiple walls. According to another embodiment, device 400 may assign one or more lines or vectors connecting data points, shown as 425, to define the surface of the structure.

According to certain embodiments, spatial model 420 may be a point cloud of data points detected by a radar sensor of device 400. Spatial model 420 may relate to interior or exterior surface areas of a structure. Spatial model 420 may be determined from a side, or from an elevated or lower angle. According to another embodiment, spatial model 420 may be determined from one of more positions of device 400. In such a case, device 400 may be configured to correlate data points captured from different positions based on measurements from multiple reference points and geospatial data determined for each point. In certain embodiments, a device may be configured to display spatial model 420. According to another embodiment, spatial model 420 and/or data points of spatial model 420 may be correlated to image data as will be discussed below in more detail. According to one embodiment, data points of spatial model 420 may be determined with a grid spacing and from a range of within 200 m. It should also be appreciated that model 420 may be based on data points determined by an integrated radar sensor having a frequency within the range of 76-82 GHz. According to another embodiment, spatial model 420 may be determined based on one or more of vertical and horizontal scanning.

Figure 5A:
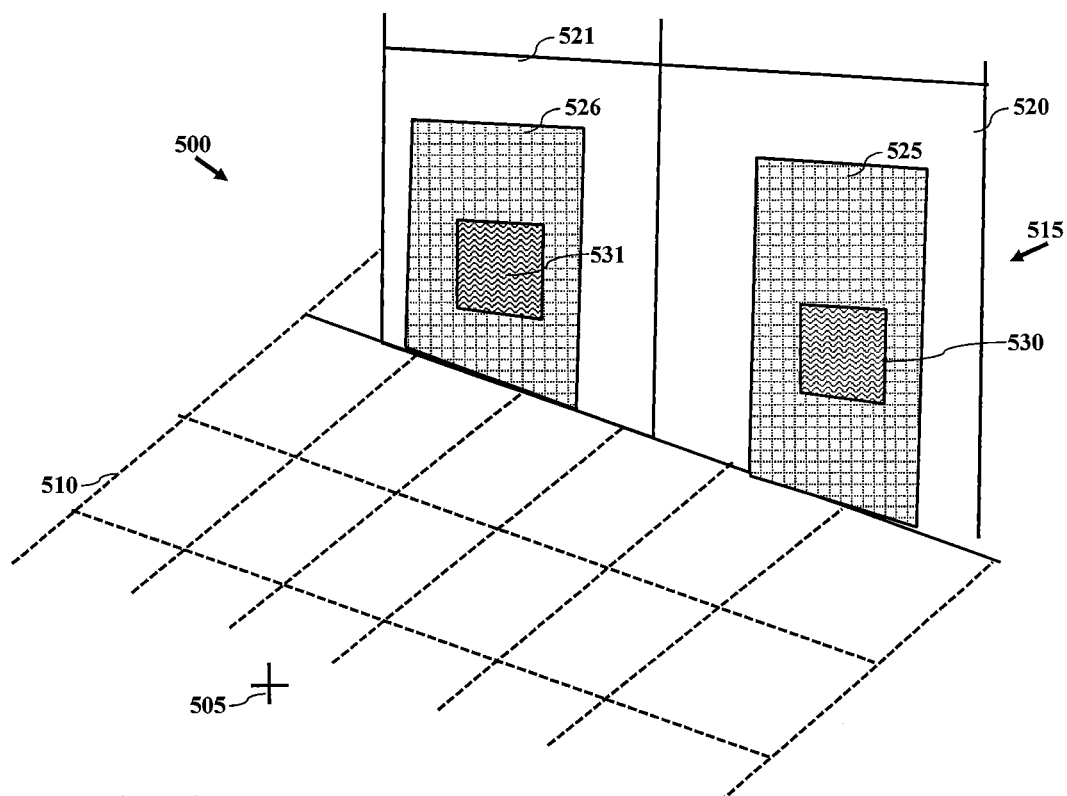
FIGS. 5A-5B depict a graphical representations of a spatial model according to one or more embodiments.
Figure 5B:
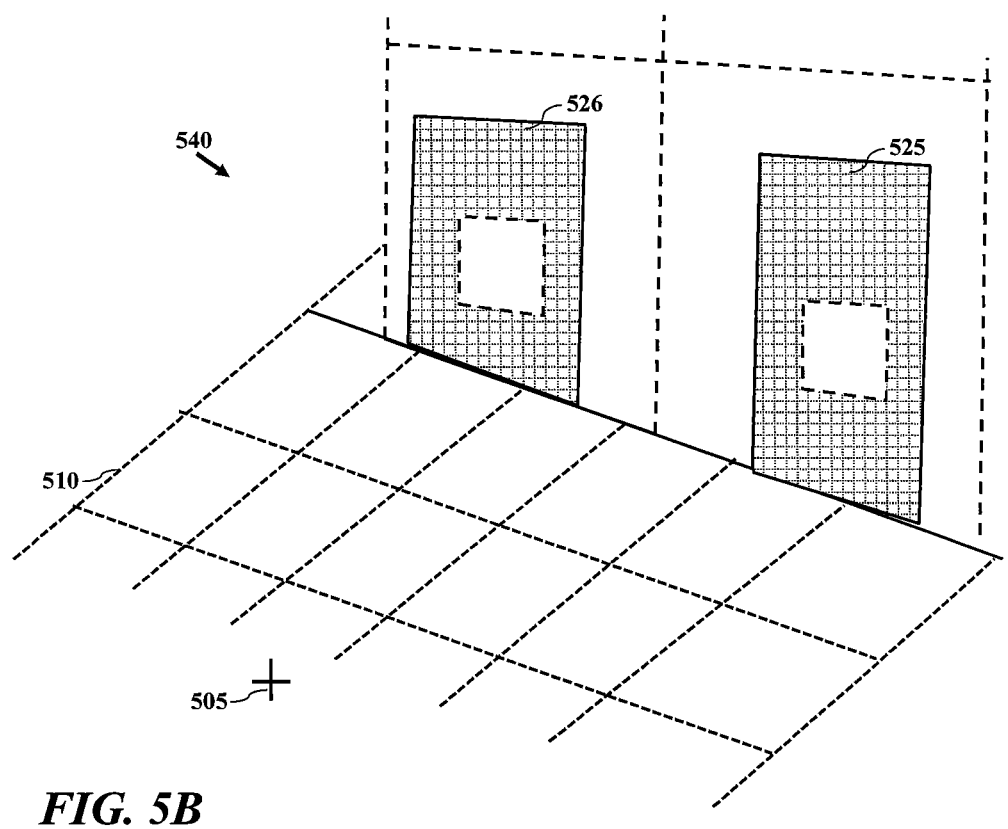

Referring now to FIGS. 5A-5B, graphical representations are depicted of a spatial model according to one or more embodiments. According to one embodiment, a spatial model may be determined by a device, such as the device of FIG. 1A or device FIG. 1B, indicating one or more surface areas of a structure. According to one embodiment, spatial model 500 may be determined by a device positioned at reference position 505, for example. Spatial model 500 may be relative to one or more geospatial coordinates, as shown by grid 510. Data points of spatial model 500 can be detected using a radar sensor of a device. Although spatial model 500 is shown in two-dimensions, the spatial model may be presented or output as a three-dimensional spatial model.

According to one embodiment, the radar sensor of a device may identify one or more portions of an object, such as portions 520 and 521. The radar sensor may also determine one or more variations in the surface of the object, based on the distance of the surface to reference position 505 for example. According to another embodiment, spatial model 500 may group data points based on distance or group data based on a geospatial positioning relative to reference position 505. Accordingly, spatial model 500 may be generated to identify separate sections/regions of a detected object, such as regions 525 and 530 of portion 520 and regions 526 and 531 of portion 521. By way of example, regions 525 and 526 may relate to a particular plane relative to grid 510, and regions 530 and 531 may relate to a particular plane (e.g., surface) relative to grid 510. In certain embodiments, a device may be configured to display spatial model 500. According to another embodiment, spatial model 500 and/or data points of spatial model 500 may be correlated to image data as will be discussed below in more detail.

According to another embodiment, a device may display only particular regions of an object, or particular objects based on user selection. FIG. 5B depicts a graphical representation of spatial model 540 including selected regions of spatial model 500. For example, regions 525 and 526 may be identified as similar regions by a device. In addition, a user may select a data point associated with one or more of regions 525 and 526, or one of the regions using a user interface of the device. As such, the device may display the selected regions as spatial model 540. Selecting particular data points or regions may be useful in tracking objects and/or comparison of spatial models to previously generated spatial models. In certain embodiments, a device may be configured to display spatial model 540. According to another embodiment, spatial model 540 and/or data points of spatial model 540 may be correlated to image data as will be discussed below in more detail. In addition, selection of data points may aid in correlating data points to image data captured by a device.

Referring now to FIGS. 6A-6C, graphical representations are depicted of device positioning according to one or more embodiments. In certain embodiments, data points may be detected by a device, such as the device of FIG. 1A or FIG. 1B, for multiple reference positions, or while the device is in motion. FIGS. 6A-6C depict graphical representations of exemplary paths that may be employed by a device. According to one embodiment, data points may be refined and or checked relative to data gathered for one or more positions. In addition, detecting data points for multiple views can allow for generating a three-dimensional model and/or for tracking object changes.

FIG. 6A depicts a device at position 600, the device configured to move in direction 601 and 602 towards positions 603 and 604 respectively. In that fashion, the device may capture data points for objects 605 and 606 from one or more perspectives. According to another embodiment, a device may be configured to circumnavigate the object of interest. Referring now to FIG. 6B, a circular path 610 is shown including start point 611. In one embodiment, the device may scan an object 620 by continuing along path 610 in a full circle. In another embodiment, the device may only travel across a portion of path 610, to an intermediary point, such as position 615. FIG. 6C depicts path 625 with a starting point shown as 625 around object 635.

Referring now to FIG. 7, a simplified system diagram is shown according to one or more embodiments. System 700 includes scanning/mapping device 705 which can be configured to communicate and interoperate with control device 710. According to one embodiment, control device 710 may be configured to control operation of device 705. Control device 710 may relate to an electronic device or portable computing device, such as a tablet. Device 705 may relate to a scanning device including a radar scanner, such as the device in FIG. 1A or FIG. 1B. In other embodiments, device 705 may be a mobile device. Device 705 and 710 may optionally include a display, such as displays 715 and 720 for providing a user interface for control of the devices. In another embodiment, displays 715 and 720 may be configured to display data point data, geospatial data, image data, such as video data or one or more images captured by device 705. As depicted in FIG. 7, control device 710 may communicate by wired and/or wireless communication with device 705 via communication path 725.

Device 705 may be configured for determination and measurement of one or more of data points based on radar scanning and capture of image data. In addition, device 705 may determine one or more of an angular offset, height, length, distance, and coordinate determination for one or more data points or regions of a captured image data. In that fashion, device 705 may be employed for use in one or more of surveying, engineering, and construction. In certain embodiments, device 705 includes display 715 to provide a control screen to control operation of the device. Display screen 715 may be touch sensitive. In certain embodiments, either of display 715 and display 720 may be optional.

Figure 8:
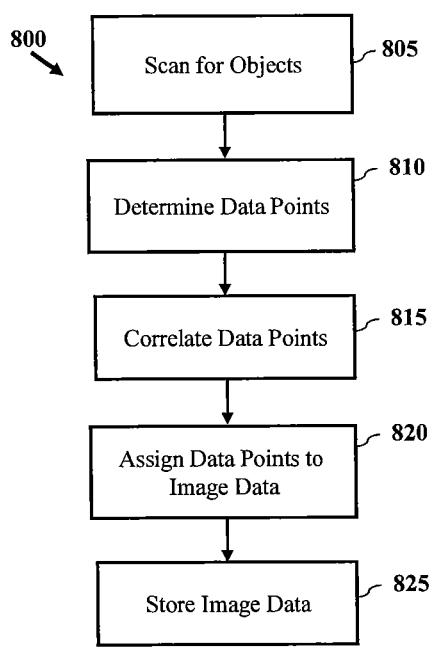
FIG. 8 depicts a process for detecting and mapping data points according to one or more embodiments.

FIG. 8 depicts a process for detecting and mapping data points according to one or more embodiments. Process 800 of FIG. 8 may be initiated by scanning for objects at block 805, such as radar scanning and/or image capturing. Data points may be determined at block 810 based on detected radar data and/or image data. In one embodiment, data points may be determined for radar data and image data individually. According to another embodiment, data points may be determined only in radar data at block 810. Based on the data points determined at block 810, the data points may be matched to one or more portions of image data detected by the device. Matching data points may be based on calibration of the radar senor and the image sensor. According to another embodiment, matching data points at block 815 may be based on overlaying image data and spatial modeling data. Portions of the image data may be matched to portions of the spatial model. At block 820, data points may be assigned to the image data. For example, for each data point matched to image data, geospatial data determined for the data point may be assigned to a particular region, or the position of the data point in the image data.

In certain embodiments, matching/correlating data points to image data includes assigning spatial model data to the image data. In another embodiment, matching/correlating data points to image data may include assigning only a portion of detected data points to the image data. At block 825, the device may store the image data including data points assigned to the image.

Figure 9:
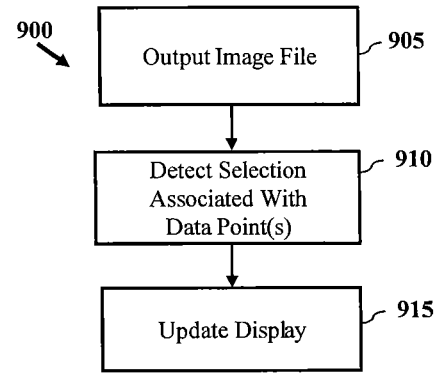
FIG. 9 depicts a process for presenting image data with data points according to one or more embodiments.

Referring now to FIG. 9, a process is depicted for presenting image data with data points according to one or more embodiments. Process 900 may be initiated at block 905 by outputting image data. Image data may be output to a display of a device (e.g., device of FIG. 1A or FIG. 1B) based on user selection of the image data. At block 910, the device may detect a selection, made via a user interface of the device or display, associated with particular data points. Based on the selection of data points, the device may update the display at block 915. Updating the display may allow for presentation of desired data points. It should be appreciated that the selection of data points at block 910 may include multiple sets of data points. Accordingly, the updated display at block 915 may be for multiple sets of data points. Output of image data with data points may be advantageous for presenting geospatial data associated with a particular portion of captured image data.

Figure 10:
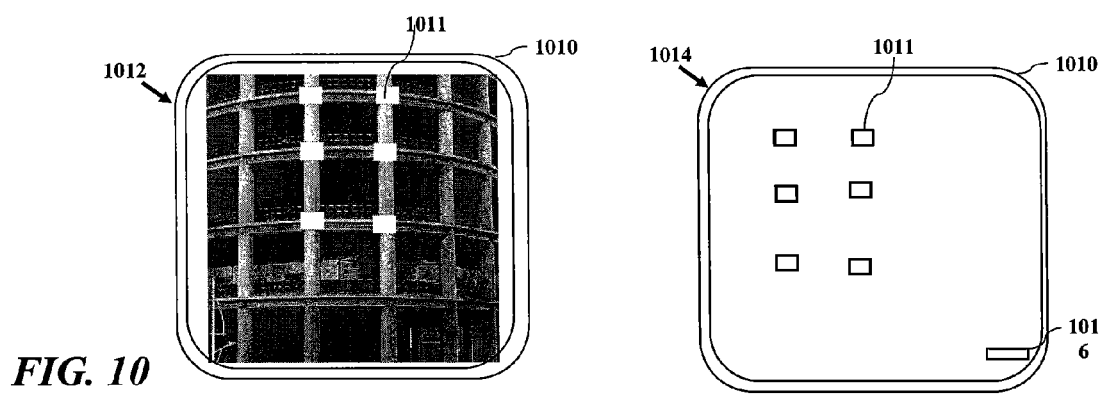
FIG. 10 depicts a graphical representation of data point presentation according to one or more embodiments.

FIG. 10 depicts a graphical representation of data point presentation according to one or more embodiments. According to one embodiment, a device may be configured to present data points and image data via a display. FIG. 10 depicts a graphical representation of captured image data 1000 and a spatial model 1005 captured by a device (e.g., device of FIG. 1A or FIG. 1B). Based on the captured data, a display window 1010 of the device may present image data with and data points matched to the image data.

In certain embodiments, image data may be matched to a spatial model by correlating one or more regions of portions of the data through overlay or analysis of similar regions by the device. In other embodiments, a target or reference point may be place on or near an object and that may be detected and utilized for aligning image data and the spatial model. Target 1001 may relate to a target that may be detected by imaging and may reflect/absorb radar waves in such a way to appear in the spatial model.

Display window 1012 represents captured image data with one or more graphical elements, shown as 1011, to indicate that geospatial data or data points have been matched to the image data. Display window 1014 represents a view of the data points without underlying image data. Display window 1014 also includes a region, shown as element 1016 which may be selectively used to identify data associated with the data points.

While this disclosure has been particularly shown and described with references to exemplary embodiments thereof; it will be understood by those skilled in the art that various changes in form and details may be made therein without departing from the scope of the embodiments encompassed by the appended claims.

What is claimed is:

1. A method for detecting data points and spatial modeling, the method comprising the acts of:
   determining a position of a device;
   detecting data points by an integrated radar sensor of the device, wherein the data points are determined for one or more objects;
   generating a spatial model of the one or more objects based on the detected data points, wherein the spatial model is generated relative to the position of the device;
   storing, by the device, the data points; and
   storing, by the device, the spatial model,
   wherein each data point is associated with a point in space associated with one of the one or more objects and each data point is assigned a geospatial data point relative to the position of the device.

2. The method of claim 1, wherein determining the position of the device is based on at least one of global positioning data received by the device and an orientation determined for the device.

3. The method of claim 1, wherein detecting data points by the integrated radar sensor includes detection by at least one of a solid-state radar sensor and chip based radar sensor.

4. The method of claim 1, wherein detecting data points by the integrated radar sensor includes generating a sweep signal configured to detect a plurality of data points during a single sweep.

5. The method of claim 1, wherein data points are detected by the integrated radar sensor having a range resolution of 2 cm and an azimuth resolution of 0.2 degrees.

6. The method of claim 1, wherein data points are detected by the integrated radar sensor with a resolution of 1.7 cm at 5 m and 10 cm at 30 m.

7. The method of claim 1, wherein data points are detected by the integrated radar sensor with a bandwidth frequency within the range of 76-82 GHz.

8. The method of claim 1, wherein the integrated radar sensor has one or more of a short-range mode and a long-range mode.

9. The method of claim 1, wherein each data point is associated with one or more of an interior surface and exterior surface of a structure.

10. The method of claim 1, wherein the one or more objects are characteristics of a surface.

11. The method of claim 1, wherein the spatial model is one or more of a two-dimensional model and a three-dimensional model for the one or more objects.

12. The method of claim 1, wherein the device is a mobile device, and data points are determined for one or more reference positions of the mobile device.

13. The method of claim 1, further comprising tracking the one or more objects based on detected data points.

14. A device for detecting data points and spatial modeling, the device comprising the acts of:
    a positioning module configured to determine a position of the device;
    an integrated radar sensor configured to detect data points, wherein the data points are determined for one or more objects; and
    a processor configured to
       generate a spatial model of the one or more objects based on the detected data points, wherein the spatial model is generated relative to the position of the device,
       control storage of the data points, and
       control storage of the spatial model,
    wherein each data point is associated with a point in space associated with one of the one or more objects and each data point is assigned a geospatial data point relative to the position of the device.

15. The device of claim 14, wherein the positioning module determines the position of the device based on at least one of global positioning data received by the device and an orientation determined for the device.

16. The device of claim 14, wherein the integrated radar sensor is at least one of a solid-state radar sensor and radar on a chip sensor.

17. The device of claim 14, wherein the integrated radar sensor detects data points by generating a sweep signal configured to detect a plurality of data points during a single sweep.

18. The device of claim 14, wherein the integrated radar sensor detects data points with a range resolution of 2 cm and an azimuth resolution of 0.2 degrees.

19. The device of claim 14, wherein the integrated radar sensor detects data points with a resolution of 1.7 cm at 5 m and 10 cm at 30 m.

20. The device of claim 14, wherein data points are detected by the integrated radar sensor with a bandwidth frequency within the range of 76-82 GHz.

21. The device of claim 14, wherein the integrated radar sensor has one or more of a short-range mode and a long-range mode.

22. The device of claim 14, wherein each data point is associated with one or more of an interior and exterior surface of a structure.

23. The device of claim 14, wherein the one or more objects are characteristics of a surface.

24. The device of claim 14, wherein the spatial model is one or more of a two-dimensional model and a three-dimensional model for the one or more objects.

25. The device of claim 14, wherein the device is a mobile device, and data points are determined for one or more reference positions of the mobile device.

26. The device of claim 14, wherein the device is further configured to track the one or more objects based on detected data points.

27. A computer program product stored on a non-transitory computer readable medium including computer executable code for detecting data points and spatial modeling, the computer program product comprising:
    computer readable code to control an integrated radar sensor of the device to detect data points, wherein the data points are determined for one or more objects;

computer readable code to generate a spatial model of the one or more objects based on the detected data points, wherein the spatial model is generated relative to the position of the device;
computer readable code to store the data points; and
computer readable code to store the spatial model,
wherein each data point is associated with a point in space associated with one of the one or more objects and each data point is assigned a geospatial data point relative to the position of the device.

* * * * *